Nov. 19, 1935.   C. N. MITCHELL   2,021,193
CONNECTING ROD FOR SHOCK ABSORBERS
Original Filed Aug. 22, 1930
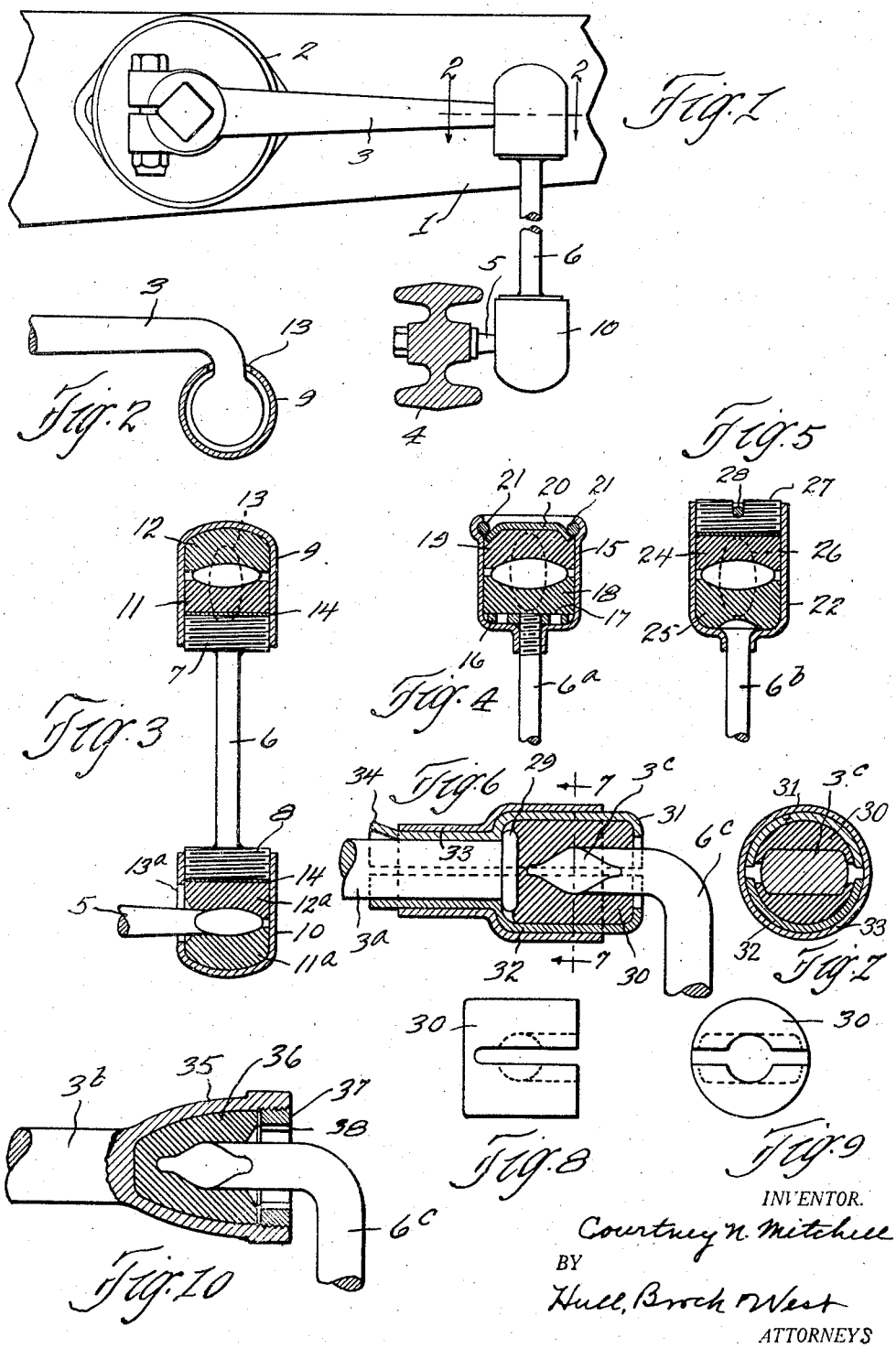
INVENTOR.
Courtney N. Mitchell
BY
Hull, Brock & West
ATTORNEYS

Patented Nov. 19, 1935

2,021,193

UNITED STATES PATENT OFFICE 2,021,193

CONNECTING ROD FOR SHOCK ABSORBERS

Courtney N. Mitchell, Berea, Ohio, assignors to Houde Engineering Corporation, Buffalo, N. Y., a corporation of New York Application August 22, 1930, Serial No. 477,035
Renewed December 15, 1932

7 Claims. (Cl. 287—85)

This invention relates to a connecting link which is particularly adapted for use with a vehicle shock absorber although the device is of general application.

The main object of the invention is to provide a connecting link of the character described which consists essentially of a rod which is provided at its opposite ends with a housing or casing in which is secured one or more blocks of elastic material, such as rubber, each block being shaped to define an opening or socket which is oval, spheroid or elliptical in shape and adapted to receive therein the similarly shaped end of a stud or arm, the housing each being provided with an oval or elongated opening to facilitate the insertion of the end of the stud or arm therein.

Another object of the invention is to provide a connecting link of the character described for connecting the arm of a shock absorber with a stud carried by an axle in such a manner as to provide a yielding connection between the stud and the arm which will permit a slight relative movement therebetween.

A further object of the invention is to provide a connecting rod of the character described which is noiseless and requires no lubrication and which is provided with adjustable means for connecting the same so as to allow for the numerous angles required in the normal operation of the shock absorber.

A further object of the invention is to provide a connecting link of the character described which will require no lubrication and which is well adapted for production at comparatively low cost.

A still further object of the invention is to provide a connecting link of the character described which will offer considerable resistance to the relative movement between the vehicle frame and axle and in which the friction and wear will be reduced to a minimum.

Further and more limited objects of the invention will appear as the description proceeds and by reference to the accompanying drawing in which Fig. 1 is a fragmentary view partly in section and partly in side elevation disclosing my improved connecting link connected with the shock absorber of the vehicle; Fig. 2 is a horizontal sectional view on the line 2—2 of Fig. 1; Fig. 3 is a vertical sectional view of the connecting link shown in Figs. 1 and 2; Fig. 4 is a fragmentary sectional view disclosing a modified form of connecting link; Fig. 5 is a view similar to Fig. 4 disclosing a second modification; Fig. 6 is a fragmentary sectional view disclosing a third modification of the invention; Fig. 7 is a vertical sectional view on the line 7—7 of Fig. 6; Fig. 8 is a top plan view of the block of rubber used in the form of the invention shown in Fig. 7; Fig. 9 is a view in end elevation of the block of rubber shown in Fig. 8; Fig. 10 is a fragmentary sectional view of another modification of the invention.

Referring now to the drawing, the reference character 1 designates a portion of the frame of an automotive vehicle to which is secured a shock absorber 2 of the double acting type, the details of construction of which form no part of this invention. The shock absorber 2 is provided with an arm 3 which extends outwardly therefrom and has its outer end bent at an angle thereto as shown most clearly in Fig. 2. The outer end of the arm 3 is slightly oval or elliptical in shape as shown most clearly in Figs. 2 and 3. The reference character 4 designates the axle of an automotive vehicle to which is secured a stud 5, which is secured to the axle in any suitable manner. The outer end of the stud 5 is slightly enlarged and is substantially the same shape as the outer end of the arm 3. The connecting link consists essentially of a rod 6 the opposite ends of which are slightly enlarged and exteriorly threaded as shown at 7 and 8. Threadedly secured over each of the threaded portions 7 and 8 are housings or casings 9 and 10. Arranged within each of the housings 9 and 10 are rubber blocks 11, 12 and 11ª, 12ª, respectively, which are shaped to define a socket or recess which is oval or elliptical and adapted to receive therein the similar shaped end portions of the arm 3 and stud 5 respectively. The housings 9 and 10 are each provided in one side thereof with elongated openings 13 and 13ª which are somewhat oval or elliptical in shape so as to facilitate the insertion of the stud and arm therein. As shown, the rubber blocks define a recess in the housing having its major axis at an angle to the major axis of the opening, preferably in alignment with the short axis of the openings 13 and 13ª. Arranged within each of the housings 9 and 10 are disks 14, 14ª which are disposed between the rubber blocks and the ends of the rod to provide a bearing for the rubber blocks 11, 11ª.

Due to the fact that the end portions of the arm 3 and stud 5 are oval or elliptical in shape and fit within similarly shaped sockets provided in the rubber blocks, it will be seen that upon relative movement between the vehicle frame and axle, the end portions of the stud and arm will tend to turn within the sockets. The rubber blocks fitting closely around the end portions of the stud and arm tend to resist this turning movement thereby affording some additional checking action. The edges of the end portions of the stud and arm are slightly flattened as shown in Figs. 2 and 3 so that the rubber will not be unduly worn by any movement of the same within the sockets. Since the sockets formed in the rubber blocks fit substantially around the entire stud head, relative movement between the stud and housing is permitted primarily by interparticle flow of the rubber. In securing the connecting link to the stud 5, the lower block of rubber 11a is first placed within the housing 10 and the end of the stud 5 turned about 90 degrees from the position shown in Fig. 3 and inserted through the elongated opening 13a, the rubber block 11a being compressed by a suitable tool so as to permit the insertion of the stud therein. The end of the stud 5 is then rotated back about 90° to be seated in the recess of the rubber block 11a. The other rubber block 12a is then placed in the housing over the end of the stud and the portion 8 of the rod 6 is threaded in the housing to compress the blocks. The end of the stud is thus locked in the housing since it cannot be removed through the opening 13a unless it is rotated about 90°. The arm 3 is secured in the housing 9 in the same manner. It will be seen that the elongated openings 13 and 13a serve to facilitate securing the connecting link in place and also provide suitable means for holding the parts in position. After the connecting link has been secured to the stud and arm, adjustment can be made by turning the rod 6 to place the rubber blocks under compression.

In Fig. 4 there is disclosed a slightly modified form of my invention in which the connecting link consists of a rod 6a, the upper end of which is exteriorly threaded and over which is secured a housing 15 which is held in place by means of a nut 16 threadedly secured over the threaded end portion of the rod. The nut 16 is provided with tool engaging portions 17 whereby the same may be tightened. Arranged within the casing or housing 15 are blocks of rubber 18 and 19 which are substantially identical with the blocks of rubber 11 and 12 used in connection with the form of the invention shown in Figs. 1 to 3 inclusive. However, in this case, the upper end of the casing is open and is closed by means of a cap or cover 20 which is secured in place by means of a split ring 21 fitting within a groove provided in the upper end of the housing 15. It is of course understood that the opposite end of the rod 6a is similarly constructed.

In Fig. 5 there is disclosed another modification of my invention in which the connecting link consists of a rod 6b over the upper end of which is secured a casing or housing 22. The upper end of the rod 6b is flattened or headed to secure the casing or housing 22 thereto. The upper end of the housing 22 is interiorly threaded. Arranged within the housing 22 are blocks of rubber 24 and 25 which are shaped to provide an oval or elliptical socket adapted to receive a similarly shaped end portion of the arm 3 and stud 5. The housing 22 is also provided at one side thereof with an elongated opening 26 having its major axis at an angle to the major axis of the socket defined by the rubber block. This recess is preferably in alignment with the short axis of the opening 26 to facilitate insertion of the end portion of the stud or arm therein. The upper end of the casing or housing 22 is closed by means of a cap or cover 27 which is threadedly secured within the upper end of the housing and locked in the adjusted position by means of a cotter pin 28. It is of course understood that the opposite end of the rod 6b is similarly constructed.

In Fig. 6 there is disclosed another modification of my invention in which the shock absorber arm 3a is provided with an enlarged end portion 29. In this form of the invention, the connecting link consists of a rod 6c having an enlarged end portion 3c of the shape shown most clearly in Fig. 6, and over which is secured a block of rubber 30 of the shape shown most clearly in Figs. 8 and 9. Secured over the block of rubber 30 are a pair of semi-circular sleeves 31 and 32. Fitting over the arm 3a and slidably mounted thereon is a cylindrical sleeve or collar 33 which is shaped in section as shown most clearly in Fig. 6. The semi-cylindrical sleeves 31 and 32 are fitted over the block of rubber and then inserted into the sleeve 33. The sleeve 33 is forced outwardly over the sleeves 31 and 32 so as to rigidly secure the same in place. The sleeve 31 is provided with a tab portion 34 which is adapted to be bent outwardly to the position shown in Fig. 6 so as to secure the sleeve 33 in place. The outer ends of the semi-cylindrical sleeves 31 and 32 are bent inwardly so as to secure the rubber block 30 therein thus leaving an opening about the connecting rod 6c of sufficient size to permit a slight relative movement between the arm 3a and the connecting rod 6c. The operation and function of this form of the invention is substantially identical with the forms of the invention hereinbefore described. However, in this form of the invention, it is not necessary to have an opening in the housing to permit the insertion of the end portion of the stud or arm therein. It is of course understood that the connection at the opposite end of the connecting rod 6c is of similar construction.

In Fig. 10 there is disclosed still another modification of my invention in which the shock absorber arm 3b is provided with an enlarged end portion defining a housing or casing 35 the outer end of which is open and interiorly threaded. Fitting within the enlarged portion 35 is a block of rubber 36 which has an opening therein shaped to define an oval socket or recess which is adapted to receive the similarly shaped projecting end portion of the connecting rod 6c. Threadedly secured within the end of the housing 35 is an annular ring or nut 37 which surrounds the end portion of the arm 3 and secures the rubber block 36 in place. The ring or nut 37 is provided with tool engaging portions 38 by means of which the same may be turned to adjust the pressure upon the rubber block. The opening in the nut 37 is of such size as to permit of some relative movement between the shock absorber arm 3b and the connecting rod 6c. It is of course understood that the connection at the opposite end of the connecting rod 6c is of similar construction.

In all forms of the invention herein described, the end portions of the arm and stud are oval or elliptical in shape and adapted to fit within a similarly shaped opening provided in the housings. In each case, this end portion is surrounded by one or more blocks of rubber or other suitable material which will permit a slight movement of the end portions of the stud or arm therein, thus providing a somewhat resilient but operative connection between the arm and stud which will provide an additional checking action.

In the forms of the invention illustrated in Figs. 1 to 5 inclusive, the housing or casing is provided with an elongated opening which is somewhat oval or elliptical in shape and has its major axis disposed substantially parallel with the axis of the rod, thus providing a very simple and effective means for securing the connecting link in place. It is to be understood that the various forms of the invention herein disclosed are merely illustrative and are not to be considered in a limiting sense, as various changes may be made in the details of construction as well as in the shape, size and manner of securing the parts in place without departing from the spirit of my invention. My invention is therefore limited only in accordance with the scope of the appended claims.

Having thus described my invention, what I claim is:

1. A connecting rod for shock absorbers comprising a rod one end portion of which is slightly enlarged, a sleeve fitting over said end portion and defining a housing having an opening therein, a thimble fitting over said sleeve and slidable thereon, means for securing said thimble in position, and a block of resilient material secured in said sleeve and shaped to define a socket which is disposed opposite said opening and adapted to receive the end portion of a stud or arm therein.

2. In a link assembly, a socket member comprising two elongated recessed shells secured together, a resilient bushing molded to the shape of the socket and compressed between said shells, said bushing having a narrow recess therein, transversely thereof, said shells having cuts in adjacent edges which when the shells are secured together form an opening in the socket, and a stud member passing through said opening and having a flat head portion larger than said opening embedded in the bushing recess and frictionally gripped by said bushing so that movement between the stud and socket is permitted only due to the inter-particle flow of the bushing material.

3. In a flexible connection, two connected members, a socket of resilient material, an enclosure for said socket, said enclosure comprising a pair of complementary members having edges in substantially contiguous relationship, an integral portion of one of said connected members engaging the interior of said socket at one end of the enclosure, an integrally formed and extended portion of the other connected member being rotatably contained within said enclosure at its other end, and holding means for said complementary members adapted to compress the aforesaid socket.

4. In a connecting link, a connected member having an enlarged portion, a unitary socket of resilient material adapted to open to receive said enlarged portion, an enclosure for said socket, said enclosure comprising two elongated complementary members having substantially contiguous edges, said enclosure surrounding said socket at one end of the enclosure and surrounding an integrally formed and extended portion of another connected member at the other end of the enclosure, and means for holding said complementary members in compressing relationship with said socket.

5. In a flexible connection, two connected arms, each of said arms having an integrally extending enlarged portion with an enlarged end, the extending portion of one arm being curved, two complementary hollow members having axially extending proximate edges, a socket adapted to be opened resiliently to receive the enlarged end of one of said arms, each of said enlarged portions being enclosed between the complementary hollow members at their opposite ends, and means for holding the hollow members in assembled relationship.

6. In a link assembly, a socket member comprising two elongated recessed shells secured together, a resilient bushing molded to the shape of the socket and compressed between the shells, said bushing having a recess therein, said recess having an entry opening smaller than the interior of the recess, a stud member having an enlarged end in said recess, a surface portion of the enlarged end being of rounded contour, the opening of said recess being adapted to be enlarged resiliently for the passage of said enlarged end, and cuts in the adjacent edges of the aforesaid shells to provide a passage for a part of the aforesaid stud.

7. In a link assembly, a socket member comprising two elongated recessed shells, a bushing formed to the shape of the socket, a recess in said bushing adapted to receive an enlarged end of a stud member, and a sleeve telescopically engaging said shells, a portion of one of said shells constituting a locking means for said sleeve.

COURTNEY N. MITCHELL.